United States Patent [19]

Desplanches et al.

[11] 4,041,216
[45] Aug. 9, 1977

[54] SODIUM-SULPHUR BATTERY, MORE PARTICULARLY FOR ELECTRICAL DRIVE

[75] Inventors: Gérard Desplanches, Villejust; Yvon Lazennec, St Michel sur Orge; Alain Wicker, Limours, all of France

[73] Assignee: Compagnie Generale d'Electricite S.A., Paris, France

[21] Appl. No.: 663,027

[22] Filed: Mar. 2, 1976

[30] Foreign Application Priority Data

Mar. 17, 1975 France ............................. 75.08258

[51] Int. Cl.² .......................................... H01M 6/18
[52] U.S. Cl. .................................. 429/104; 429/122; 429/159; 429/191
[58] Field of Search ............. 136/6 F, 6 FS, 20, 83 R, 136/83 T, 100 R, 153; 429/104, 102, 122, 159, 191, 30, 31

[56] References Cited

U.S. PATENT DOCUMENTS

| 3,404,035 | 10/1968 | Kummer et al. | 136/83 R X |
|---|---|---|---|
| 3,413,150 | 11/1968 | Kummer et al. | 136/6 FS |
| 3,758,337 | 9/1973 | Fally et al. | 136/6 FS |
| 3,811,943 | 5/1974 | Minck et al. | 136/6 FS |
| 3,946,751 | 3/1976 | Breiter et al. | 136/6 FS |

Primary Examiner—Anthony Skapars
Attorney, Agent, or Firm—Sughrue, Rothwell, Mion, Zinn and Macpeak

[57] ABSTRACT

The invention relates to a sodium-sulphur battery for electrical drive. It is formed by elements each comprising a cathode tank containing sulphur, a solid electrolyte tube closed at its lower end, containing sodium and arranged in the said cathode tank, a ceramic insulating support for keeping the said electrolyte tube in the said cathode tank, an anode tank containing a supply of sodium, that battery being characterized in that it comprises $m$ groups of $n$ modules each comprising $p$ elements, those elements being electrically interconnected in parallel in each of the modules by means of plates connected to the bottoms of the said cathode tanks and anode tanks respectively, each of the said plates comprising a substantially central bore. The invention is implemented for propelling all electric vehicles.

10 Claims, 8 Drawing Figures

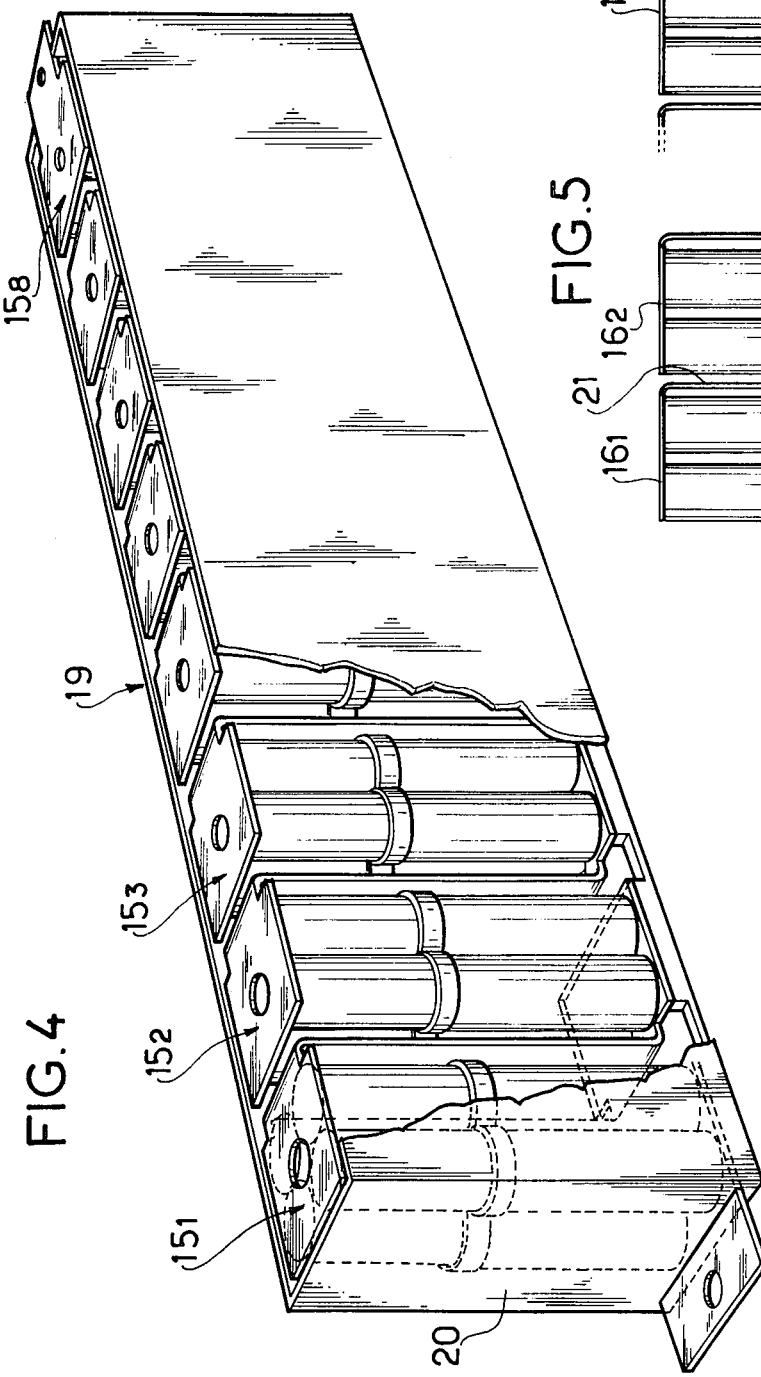
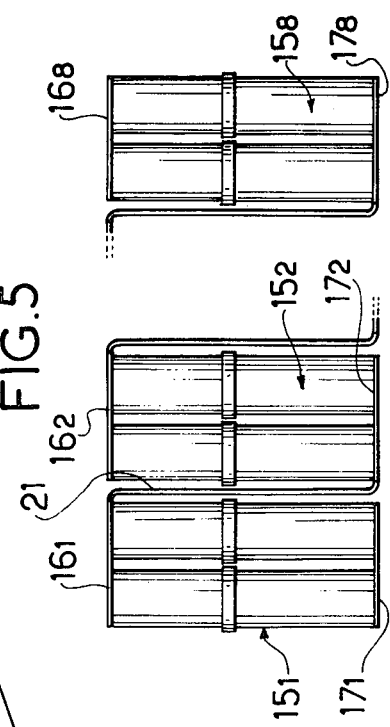

SODIUM-SULPHUR BATTERY, MORE PARTICULARLY FOR ELECTRICAL DRIVE

The present invention has as its object a battery in which electrochemical cells of the sodium-sulphur type are implemented, it being possible to use such a battery more particularly in the branch of electrical drive.

The advantage afforded by such batteries as a source of power for non-polluting electric vehicles no longer needs to be demonstrated.

It is stated briefly for reference that in electrochemical cells of the sodium-sulphur type, the anode reagent is constituted by an alkaline metal, generaly sodium, which must be liquid at the operating temperature. The cathode reagent is constituted generally by sulphur or sodium salts of that element, but can be constituted also by phosphorus, selenium and alkaline salts of those elements. In the case where the reactive materials are sulphur and sodium, the electrochemical reaction is a reversible forming of sodium polysulphides whose sodium content increases during the discharge. As for the electrolyte, which separates the cathode and anode reagents, it must be solid at operating temperature, permeable to the alkaline ions which are formed in the anods compartment and impermeable to electrons. It is generally constituted by beta sodium alumina, that is, by a compound comprising about 5 to 9 molecules of alumina for one molecule of sodium oxide. It often has the form of a tube closed at the bottom, containing the anode reagent and immersed in the cathode reagent. The latter is contained in a metallic cathode tank. The electrolyte tube is made integral with the anode tank, the latter being connected in a fluid-tight manner to a cathode reagent tank, the connection being electrically insulating.

With a view to forming a battery which can be installed on an electric vehicle in order to provide the propulsion of the latter, it is therefore necessary to couple such electrochemical cells or elements together with a view to producing an assembly having, for a determined electric power, minimum bulk and weight.

The object of the invention is therefore a battery formed by several sodium-sulphur generating elements, such a battery being capable of providing the propulsion of an electric vehicle, while having a simple structure as well as minimum bulk and weight.

The invention therefore has as its object a battery formed by several cells or electrochemical generating elements of the sulphur-sodium type, those elements each comprising.

A cathode tank containing a cathode reagent which is liquid at operating temperature and is chosen from the group formed by sulphur, phosphorus, selenium and alkaline salts of those elements.

At least one solid electrolyte closed at its lower end, containing an anode reagent which is liquid at operating temperature and is constituted by an alkaline metal, more particularly sodium and arranged in the said cathode tank so as to be immersed in the said cathode reagent, the wall of the tube being constituted more particularly by alkaline beta alumina.

A ceramic insulating support for keeping the said electrolyte tube in the said cathode tank, the connection between that support and that tube being provided by means of a glass part.

An anode tank containing a supply of the said anode reagent and arranged above the said cathode tank, so that the said electrolyte tube opens at its upper part into that anode tank, the said plate separating the open ends of the said anode tank and of the said cathode tank.

That battery comprising $m$ groups of $n$ modules each comprising $p$ elements, characterized in that those elements are electrically interconnected in parallel in each of the modules by means of plates connected to the bottoms of the said cathode tanks and anode tanks respectively, each of the said plates comprising at least one substantially central bore.

Other characteristics and advantages of the invention will become apparent from the following description which is given by way of a purely illustrating example having no limiting character, with reference to the accompanying drawings, in which:

FIG. 4 shows a perspective view of a group of modules implemented in a battery according to the invention.

FIG. 5 shows the electrical interconnections between the modules of a group.

Figure 1:
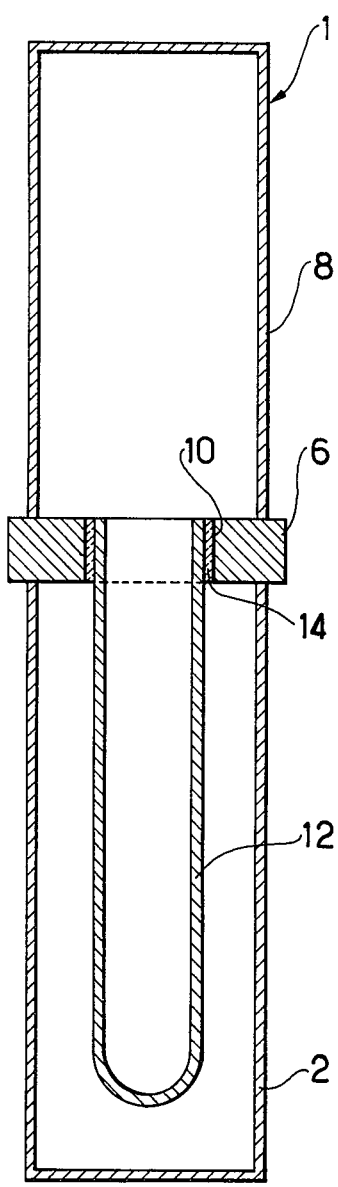
FIG. 1 shows a sodium-sulphur electrochemical generating element or cell implemented in a battery according to the invention.

The electrochemical generator element or cell has the shape of a cylinder of revolution and FIG. 1 shows a cross-section thereof in an axial plane.

The generator illustrated and referenced by the numeral 1 as a whole comprises a cylindrical cathode tank 2, lined with a graphite felt (not shown) impregnated with sulphur and acting as a current collector. The wall of the tank 2 is sealed at its upper part to the lower face of an alpha alumina plate 6, which is horizontal and circular.

A cylindrical anode tank 8 having substantially the same diameter as the cathode tank 2, is sealed by its lower part to the upper face of the plate 6.

It contains a supply of anode reagent constituted by liquid sodium.

The plate 8 is drilled at its centre with a cylindrical bore 10 having a vertical axis. The open upper end of an electrolyte tube 12 closed at its lower end, constituted by beta sodium alumina and containing the anode reagent is engaged in that bore 10.

The upper edge of the tube 12 is in the plane of the upper face of the plate 6.

A glass connecting part 14 is set between the outside wall of the top of the tube 12 and the wall of the bore 10 drilled in the plate 6 so as to make the connection fluid-tight.

The tank 8 is made, for example, preferably of aluminium and the tank 2 is made of aluminium coated, on its inside surfaces, with chromium intended to avoid any corroding by the sulphur and the ensuing passivating.

The said tanks 8 and 2 can contingently both be made of stainless steel or molybdenum, chromium or a nickel-chromium-molybdenum alloy called "Astelloy," or of a compound material, for example stainless steel coated with a layer of chromium or molybdenum, the assembly being made by coextrusion.

Figure 2:
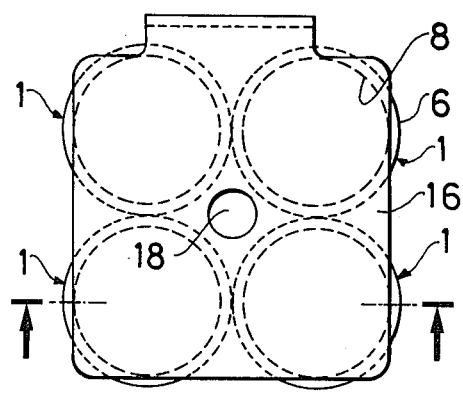
FIG. 2 shows a top view of a set of elements or module implemented in a battery according to the invention.
Figure 3:
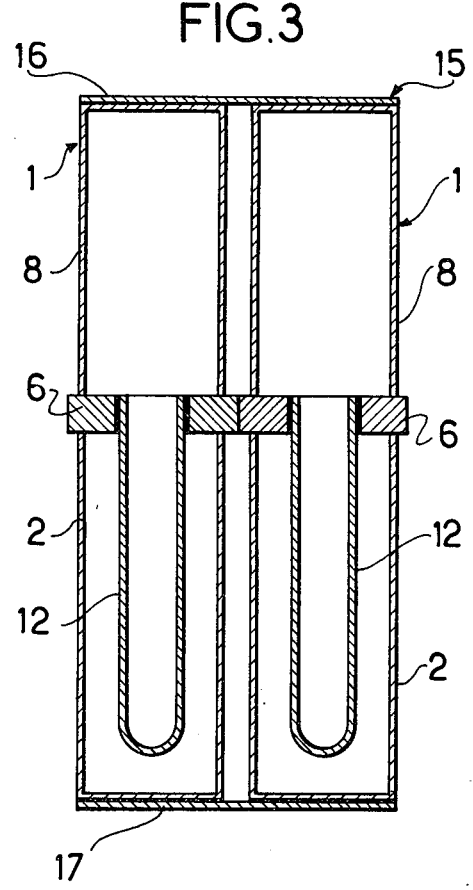
FIG. 3 shows a cross-section view of FIG. 2.

With reference to FIGS. 2 and 3, a module shown by the numeral 15 as a whole, implemented in a battery according to the invention, is illustrated.

Such a module is formed, in the example shown, by four cells 1, such as described in FIG. 1. Those cells are connected together in parallel by means of aluminium plates 16 and 17, brazed or welded to the bottom of the tanks 8 and 2 respectively. Each of these plates comprises a central bore 18 whose function will be explained elsewhere.

FIG. 4 shows a group of modules such as previously described, referenced by the numeral 19 as a whole. Such a group is formed by an enclosure 20 inside which are arranged modules $15_1$, $15_2$ ... $15_8$, there being eight modules, in this case. These modules are electrically connected together as shown in FIG. 5.

For that purpose, two neighbouring modules, for example the modules $15_1$ and $15_2$ are connected together in series by means of a connection 21 interconnecting the plate $16_1$ of the module $15_1$ to the plate $17_2$ of the module $15_2$. Likewise, the plate $16_2$ of the said module $15_2$ is interconnected to the plate $17_3$ of the neighbouring module (not shown) and so on. The last module $15_8$ is therefore connected by its plate $17_8$ to the preceding module $15_7$ (not shown).

To great advantage, the connection 21 can be formed in a single piece with the connecting plates 16, 17 of the elements. Such a connecting bar 21 therefore has the shape shown in FIG. 6.

Figure 7:
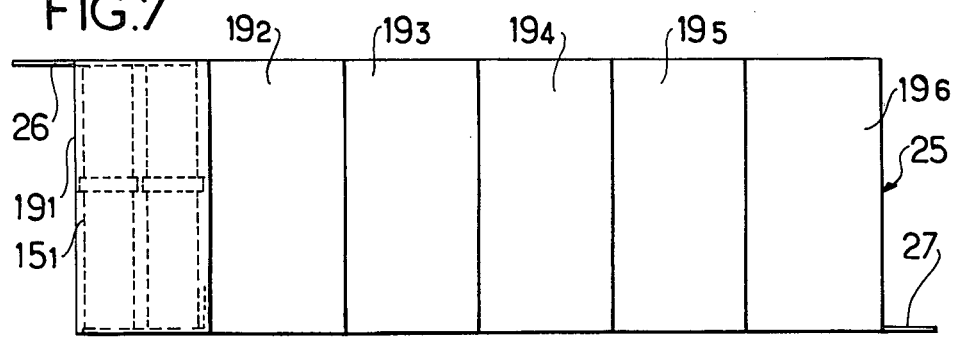
FIG. 7 shows the active part of a battery according to the invention.

FIG. 7 shows the active part of a battery formed by groups of modules such as previously described.

Figure 6:
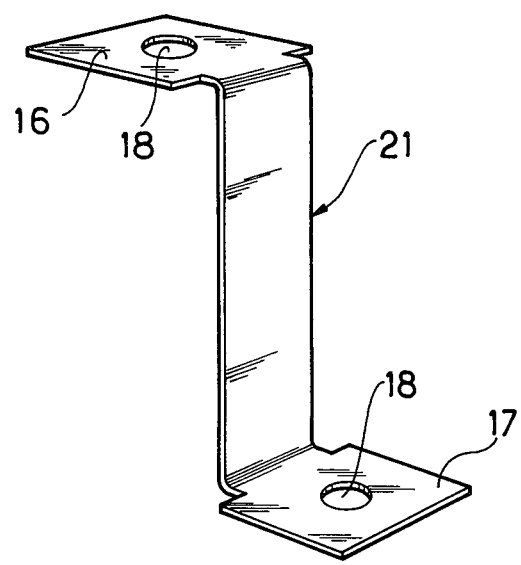
FIG. 6 shows an electrical connecting bar between the modules of a group.

Such an active part referenced 25 as a whole is formed, in the example described, by six groups $19_1$ to $19_6$, interconnected together in series by means of connection 21 (FIG. 6).

The electromotive force of such a battery is collected at the end terminals 26, 27.

Figure 8:
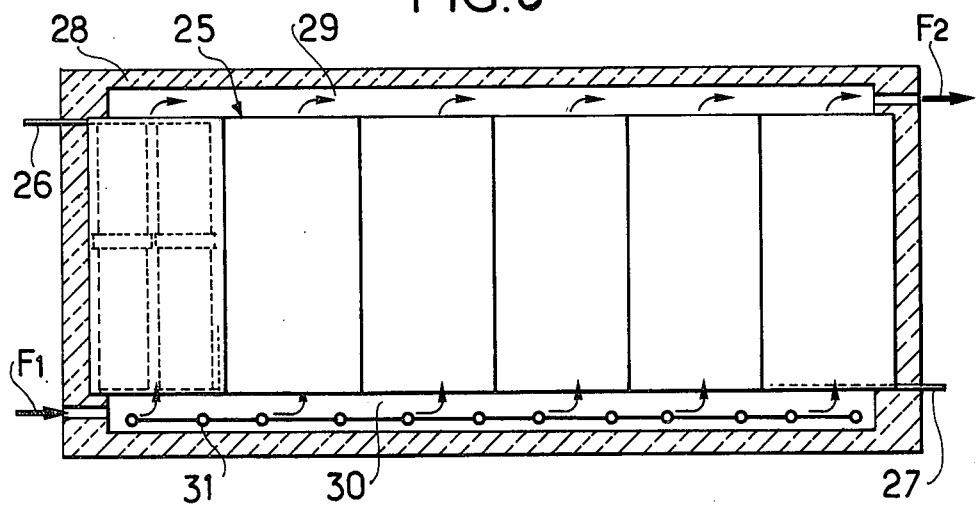
FIG. 8 shows a battery according to the invention.

FIG. 8 shows the inside aspect of a battery according to the invention. The active part 25 is arranged within a heat insulating material 28. An upper space 29 and a lower space 30 are nevertheless provided between the active part and the least insulant.

A cool air current $F_1$ can be blown in through the lower space 30 and can escape through the upper space 29 (in the direction $F_2$) with a view to cooling the active part 25 during operation.

It will be observed that this air can flow freely round the elements 1, due to the bores 18 provided in the connecting plates. The hot air escaping through the space 29 can, moreover, be used for climatizing the vehicle.

Moreover, resistors such as 31 can contingently heat up the air brought in and bring the sulphur and the sodium to the malted state, so that the battery can start up.

Inasmuch as concerns the materials used for forming such a battery, aluminium is generally used for the connections 21 and the elements 1, duralumin being used for the enclosures 20 of the groups 19.

The thermal insulent 28 will, to great advantage, be held round the active part 25 by means of brackets.

It will be observed, however, that the enclosures 20 of the groups 19 will be oxidized anodically with a view to providing an electric insulation.

It is, moreover, quite evident that the number of elements in a module, the number of modules in a group, as well as the number of groups in a battery, are in no way limited to the values given in the example described, it being obviously possible for such values to very according to the rated electrical characteristics of the battery.

Similarly, the electrical connections in series can be replaced by connections in parallel without forasmuch going beyond the scope of the invention.

In all cases, the batteries produced according to the invention have minimum weight and bulk for a given electrical power and (or) capacity and such batteries can very easily be integrated in electric vehicles.

A concrete example will be given hereinbelow of a battery according to the invention.

Each module comprises four elements.

The elements have a height of 380 mm and a diameter of 27 mm.

A group comprises 8 modules connected together in series and is arranged in an enclosure of 390 × 56 × 470 mm.

The battery comprises 6 groups connected together in series.

Such a battery has a power of 13 Kw, a capacity of 16 Kwh and a voltage of 96 V.

Its total volume is about 112 l, its weight is 70 kgs and it is capable of driving a vehicle of the tourist type at an average speed of 90 km/h, its range being 200 km.

It must be understood that the invention is in no way limited to the embodiment described and illustrated, which has been given only by way of an example.

More particularly, it is possible, without going beyond the scope of the invention, to modify details, change certain arrangements or replace certain means by equivalent means.

We claim:

1. A battery comprising:
   a plurality of cells; each cell comprising:
   a cathode tank containing a cathode reagent which is liquid at operating temperature and is chosen from the group formed by the elements of sulphur, phosphorous, selenium, and alkyline salts of those elements,
   a solid electrolyte tube partially immersed in the cathode reagent; said tube being closed at its lower end and open at its upper end and containing a sodium anode reagent which is liquid at the operating temperature, the wall of the tube being made of alkaline beta alumina,
   a ceramic insulating support supporting the electrolyte tube in the cathode tank, and a glass seal between the support and the tube,
   an anode tank containing a supply of the anode reagent and mounted above the cathode tank, so that the upper end of the electrolyte tube opens into the anode tank, said support separating the open ends of the anode and cathode tanks;
   means connecting sets of $p$ cells of said plurality of cells in parallel and comprising:
   a first conductive plate connected to the anode tank tops of each set of $p$ cells, and
   a second conductive plate connected to the cathode tank bottoms of each set of $p$ cells so that the cells in each set are separated from each other by a common space,
   each of said first and second plates containing an aperture in communication with said common space; and
   a conductive strap joining each first plate with the second plate of an adjacent set of $p$ cells so that the sets of cells are connected electrically in series to form a group of series connected sets of cells, said strap being substantially perpendicular to the first and second plates of adjacent cells.

2. A battery according to claim 1 wherein said conductive strap is integral with the first and second plates, respectively, of adjacent sets.

3. A battery according to claim 1 further comprising:
an enclosure of heat insulating material enclosing the group of cells, said enclosure having an upper space in communication with the holes in the first plates and a lower space in communication with the holes in the second plates; and
means for introducing air into one of the spaces and exhausting the air from the other of the spaces, said air passing through the apertures in the first and second plates and through the common space between cells.

4. A battery according to claim 1 wherein the cells are cylindrical, and wherein there are four cells in each set.

5. A battery according to claim 3 comprising at least one additional said group, and means connecting the groups in series.

6. A battery according to claim 1 further comprising an electrically insulating enclosure enclosing said group.

7. A battery according to claim 1 wherein the cathode and anode tanks are made of aluminum.

8. A battery according to claim 1 wherein the cathode and anode tanks are made of material selected from among stainless steel, molybdenum, chromium and a nickel-chromium-molybdenum alloy.

9. A battery according to claim 1 wherein the cathode and anode tanks are made of stainless steel having a coating selected from chromium and molybdenum.

10. A battery according to claim 5 wherein the straps are made of aluminum, and said enclosure is made of anodically oxidized duralumin.

* * * * *